United States Patent [19]

Kramer et al.

[11] 3,964,098
[45] June 15, 1976

[54] TAPE DECK WITH DRIVE MOTOR REMOTE FROM DRIVE ROLLER

[75] Inventors: Joel Kramer, Woodbury; David Fialkow, Farmingdale; W. Sterling Gorrill, Manhasset, all of N.Y.

[73] Assignee: North Atlantic Industries, Inc., Plainview, N.Y.

[22] Filed: Nov. 15, 1974

[21] Appl. No.: 524,045

[52] U.S. Cl. ........................... 360/93; 242/55.19 A
[51] Int. Cl.² ......................................... G11B 15/28
[58] Field of Search .......................... 360/93, 94; 242/55.19 A, 197–200

[56] References Cited
UNITED STATES PATENTS

| | | | |
|---|---|---|---|
| 3,420,461 | 1/1969 | Cousino | 360/93 |
| 3,578,334 | 5/1971 | Ban | 242/55.19 A |
| 3,603,596 | 9/1971 | Eash | 360/93 |
| 3,697,085 | 10/1972 | Ban | 360/93 |

*Primary Examiner*—Alfred H. Eddleman
*Attorney, Agent, or Firm*—Eisenman, Allsopp & Strack

[57] ABSTRACT

A tape deck for cartridge-encased record tapes in which the cartridge is precisely secured in a predetermined position in the tape deck in relation to its transducer and to the tape drive. The tape drive is interposed in the path of insertion of the cartridge to engage the tape-actuating mechanism in the cartridge when the cartridge is positioned in the deck. A drive motor is remotely disposed with respect to the cartridge and is coupled to the cartridge drive through a belt mechanism which allows displacement of the drive wheel through the agency of a flexural hinge support.

15 Claims, 8 Drawing Figures

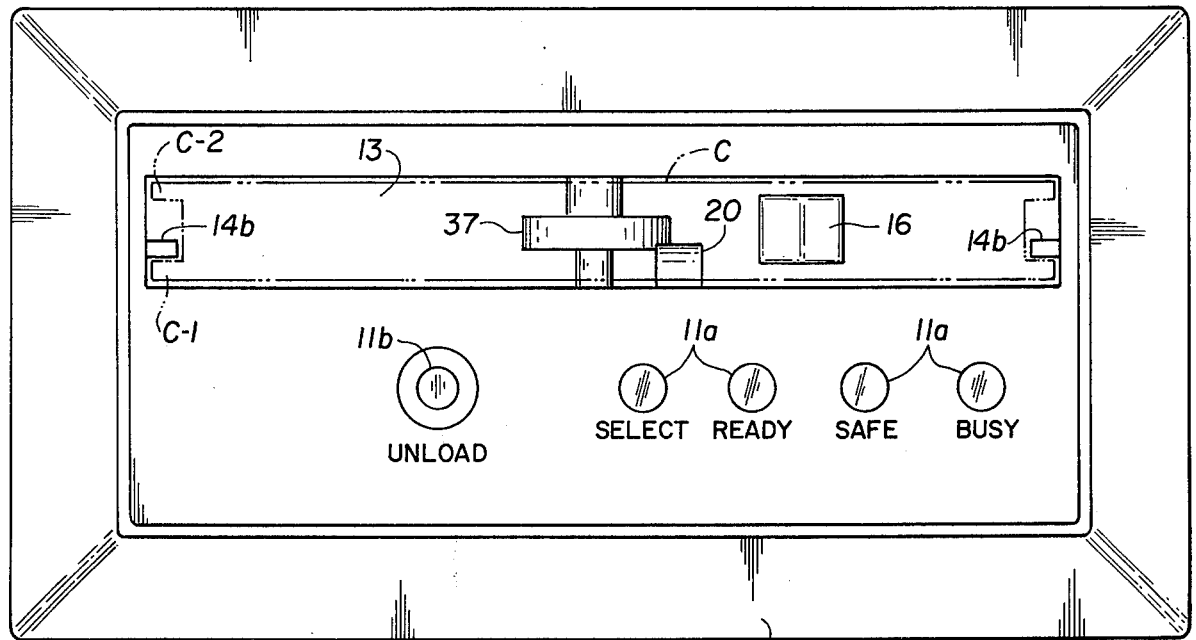
FIG.1
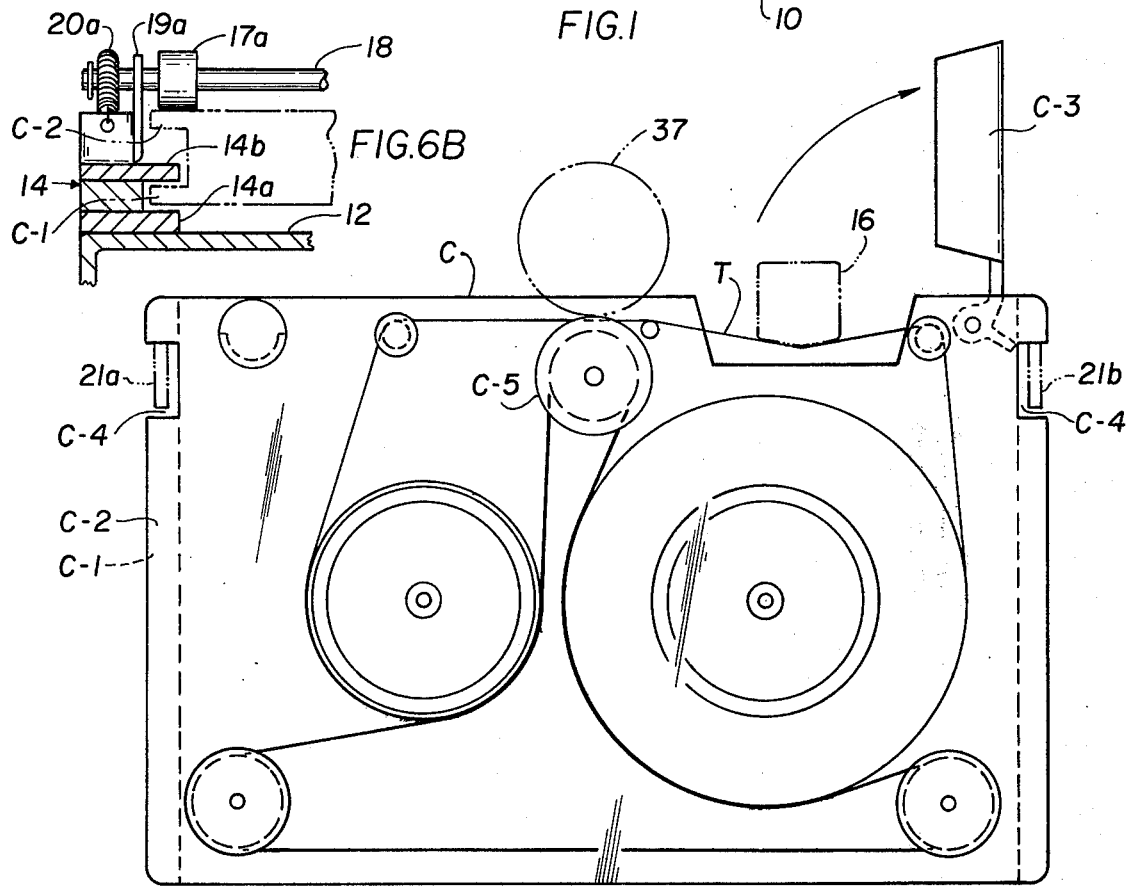
FIG.6B
FIG.6A

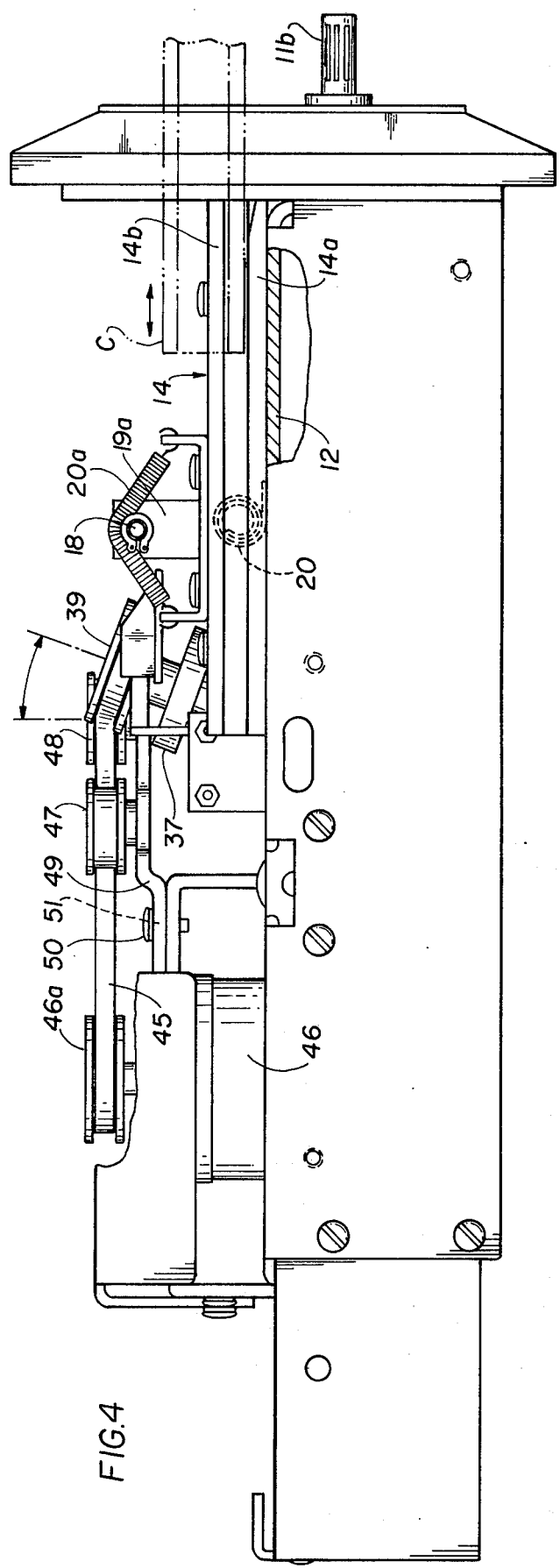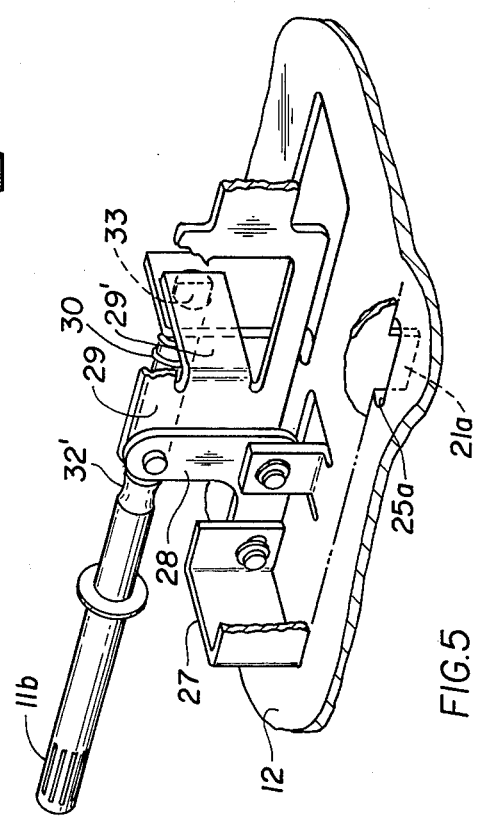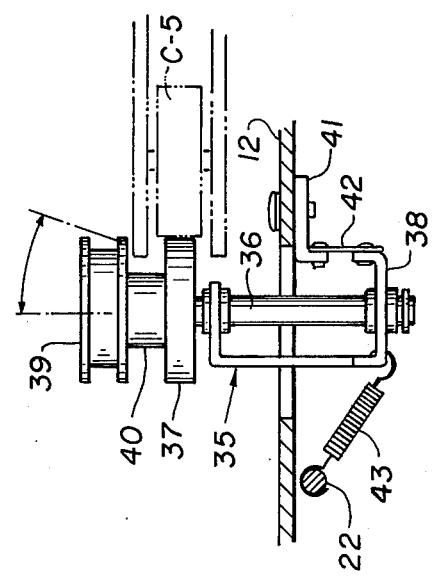
FIG.4
FIG.5
FIG.3

TAPE DECK WITH DRIVE MOTOR REMOTE FROM DRIVE ROLLER

BACKGROUND OF THE INVENTION

The invention relates to tape decks for receiving record tape cartridges for information interchange between the tape and the data system to which the tape deck is coupled.

Tape decks commonly include the mechanism which furnishes the power to drive the record tape within its cartridge, as well as the transducer, called read/write head, which either records the data on or retrieves the data from the moving tape. Effective utilization of tape as a storage medium depends upon precision in positioning the tape cartridge within the deck and in driving the tape uniformly within the positioned cartridge.

Precision cartridge positioning, however, tends in various prior art tape deck designs to be incompatible with ease of insertion and release of cartridge. It is also incompatible with freedom to operate tape deck in any desired position and under certain other environmental stresses such as vibration. Further, a reliable, non-slipping coupling between the drive motor in the tape deck and the driven mechanism of the tape cartridge also tends to be incompatible with ease of insertion and release of the cartridge.

The present invention has for its principal objects, therefore, to overcome the several disadvantages of present tape deck designs as set forth above and to provide a reliable, efficient precision tape deck for accommodating standardized tape cartridges.

SUMMARY OF THE INVENTION

The present invention utilizes within the tape deck housing a drive motor which can be larger and more powerful than can customarily be fitted within the limited spaces available. This is accomplished by mounting the motor remotely from the capstan input of the tape cartridge, with an endless drive belt being provided to couple the motor to the drive roller of the tape deck while the drive roller frictionally engages the capstan. The limbs of the belt which are coupled to the drive roller are disposed at right angles to the direction of cartridge insertion and release movement so that changes in tension of the belt do not change the coupling forces between the drive roller and the capstan. Also, adjustment of the belt tension can be made by lengthening or shortening the right angularly disposed limbs.

The drive roller is mounted in a carrier which allows the roller to yield in translational movement to comply with precisely determined position for the inserted cartridge. The yielding movement of the roller carrier is maintained within close tolerances by means of a flexure plate hinge which precludes cocking or tilting of the assembly and which frees it from normal bearing errors, thereby serving to maintain a precise parallel relationship between the axis of the hinge and the planes of the capstan and the cartridge.

Tape cartridge designs have been standardized by providing a reference plane which is adapted to be mated with precision supports in the tape deck. For ease of insertion and release, relatively generous tolerances are provided in the guideways which receive the cartridge but, at a point close to the fully inserted or "home" position, the cartridge is guided so that its reference plane is pressed against triangularly arranged reference points in the housing, preferably in the form of rollers to reduce friction and against which it is pressed by spring biased rollers on opposite sides of the cartridge.

The entering cartridge also engages a coiled tape spring, in advance of its home position, with the spring uncoiling at uniform resistance as the cartridge moves toward home until such time as it is captured by releasable latches and there held in position for information interchange. Release of the cartridge is accomplished by releasing the latches, whereupon the cartridge is urged outward by the recoiling tape spring to a point at which it is frictionally lightly held for manual removal by an operator. Release can be triggered manually or automatically from a control signal derived from the tape or elsewhere, or by a combination of both manual action and automatic release.

BRIEF DESCRIPTION OF THE DRAWINGS

FIG. 1 is an end view of a tape deck embodying the present invention showing an inserted cartridge in phantom lines and as it is viewed by the operator;

FIG. 3 is a fragmentary view in cross-section of the mechanism which couples the driving power from the tape deck to the interior of the cartridge;

FIG. 4 is a side view of the tape deck;

FIG. 5 is a fragmentary view in enlarged scale showing a portion of the cartridge-release mechanism;

FIG. 6A is a plan view diagrammatic in nature of a standardized tape cartridge; and FIG. 6B is an enlarged fragmentary view in cross-section showing an edge of the cartridge engaging a cartridge guide in the tape deck.

DESCRIPTION OF THE PREFERRED EMBODIMENT

Figure 2A:
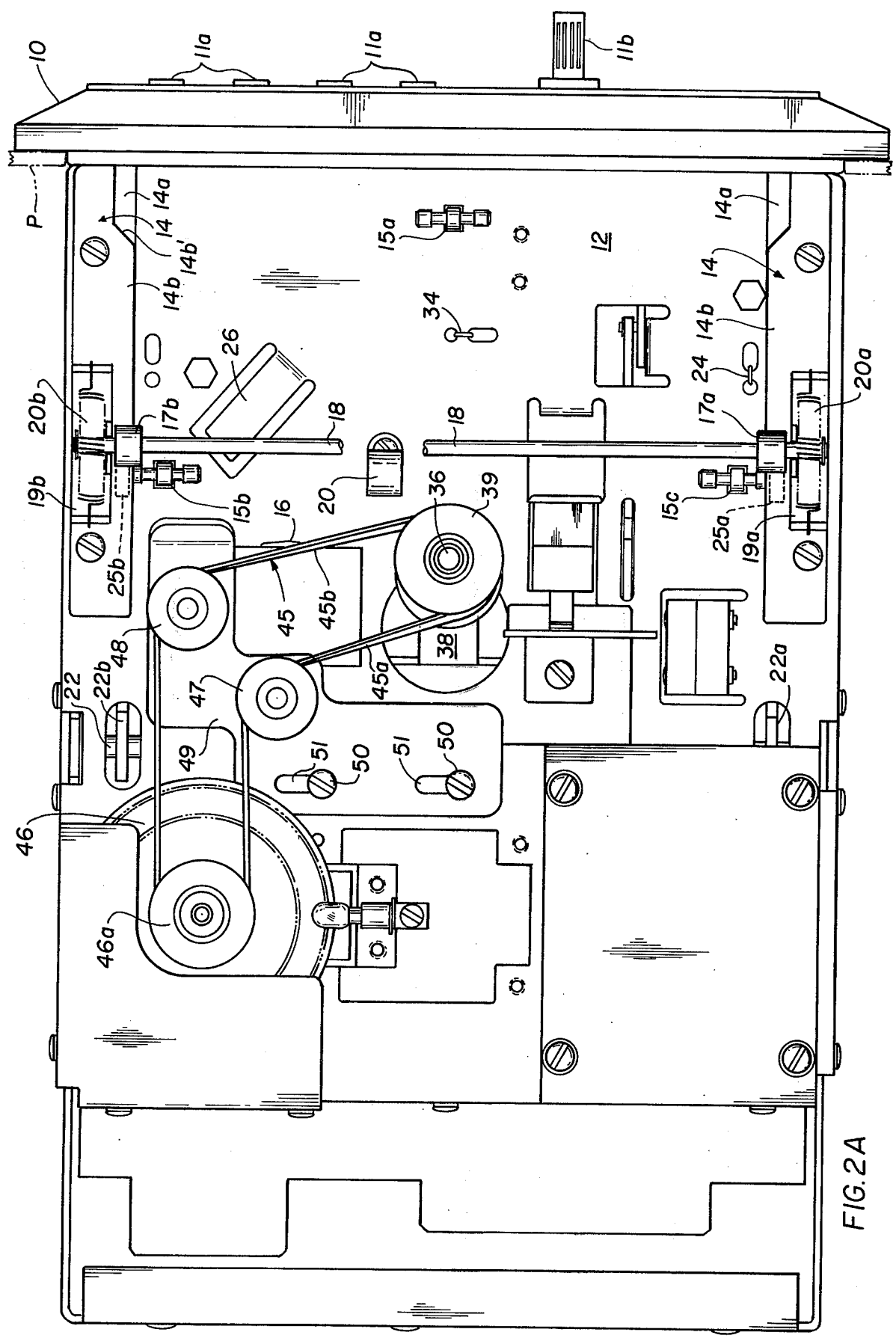
FIG. 2A is a top view of the tape deck.

Referring to FIG. 1, there is shown the normally exposed face or working end of a tape deck including a face plate 10, an array of indicator lights 11a and an unload control rod 11b. The front face also includes a loading slot 13 into which cartridge C containing the record tape (best seen in FIG. 6A) is inserted. The tape deck as an assembly is adapted to be supported, for example, in a mounting panel P shown in phantom lines in FIG. 2A.

The cartridge insertion slot 13 includes on either side guideways 14, each having a lower guide plate 14a and upper guide plate 14b (FIG. 6b). As best seen in FIGS. 1 and 6B, the cartridge C enters the guide with the flange of its base plate C-1 passing between the guide plates 14a and 14b and with the flange of its upper surface C-2 riding over the top of the upper guide 14b. It will be observed that there is substantial clearance so that the tape cartridge encounters little frictional resistance when it is first inserted into the guideways.

As best seen in FIGS. 2A, there are disposed on a base surface plate 12 within the cartridge slot 13 three precision positioning rollers 15a, 15b and 15c arranged in a triangular configuration. The tops of the rollers 15a, 15b and 15c define a common plane which establishes the vertical position of the cartridge C when fully home in its slot 13. The base C-1 of the cartridge C in the standardized magnetic tape cartridge currently in use comprises a precision metal reference plate which, when seated firmly on the three positioning rollers 15a, 15b and 15c, precisely positions the cartridge within the tape deck so that the tape T at the pickup point (FIG. 6A) will be precisely positioned with respect to the read/write head or transducer 16 in the tape deck and over the face of which the tape T slides when the system is in operation. The cartridge C is seated snugly on its positioning rollers 15a, 15b and 15c by means of a pair of pressure rollers 17a and 17b carried on a cross bar 18 seated in yokes 19a and 19b on the upper guideways 14b. The bar 18 is resiliently urged into its carrier yokes by means of coil springs 20a and 20b which allow the bar to yield upwardly in translation when the flange of the upper surface C-2 of the cartridge C is pushed between the pressure rollers 17a and 17b and the top surfaces of the respective upper guides 14b. When this occurs, the cartridge C does not touch any portion of the guides 14 but is carried exclusively by the three positioning rollers 15a, 15b and 15c on the underside and the pressure rollers 17a and 17b on the upper side (FIG. 6B).

The point in the cartridge C at which the tape engages the read/write head 16 is normally closed by a spring door C-3 which is forced open by means of a cam surface 14b' in the righthand upper guide 14b (FIG. 2A) as the cartridge is pressed into its slot. The door C-3 as it swings open is prevented from catching on the positioning roller 15b by means of a ramp finger 26 struck out of the base plate 12.

The cartridge C is pressed into the slot 13 against the force of a coiled tape spring 20 which is engaged by the forward edge of the cartridge to be partially unwound as the cartridge reaches its home position. This spring has the characteristic of exerting substantially constant spring force regardless of the degree to which it is unwound. The cardridge C is held in its home position against the release spring force by means of latch fingers 21a and 21b (FIGS. 2B and 5) which engage notches C-4 in the sides of the cartridge C. The latch fingers 21a and 21b are carried by latch arms 22a and 22b, both secured at their ends to a rocker shaft 22 and biased by a spring 24 to urge latch fingers 21a and 21b upwardly through slots 25a and 25b respectively in the base plate 12 and in the lower guide plate 14a to engage the notches C-4, thus holding the cartridge C in position against the release force of the coiled tape spring 20.

Figure 2B:
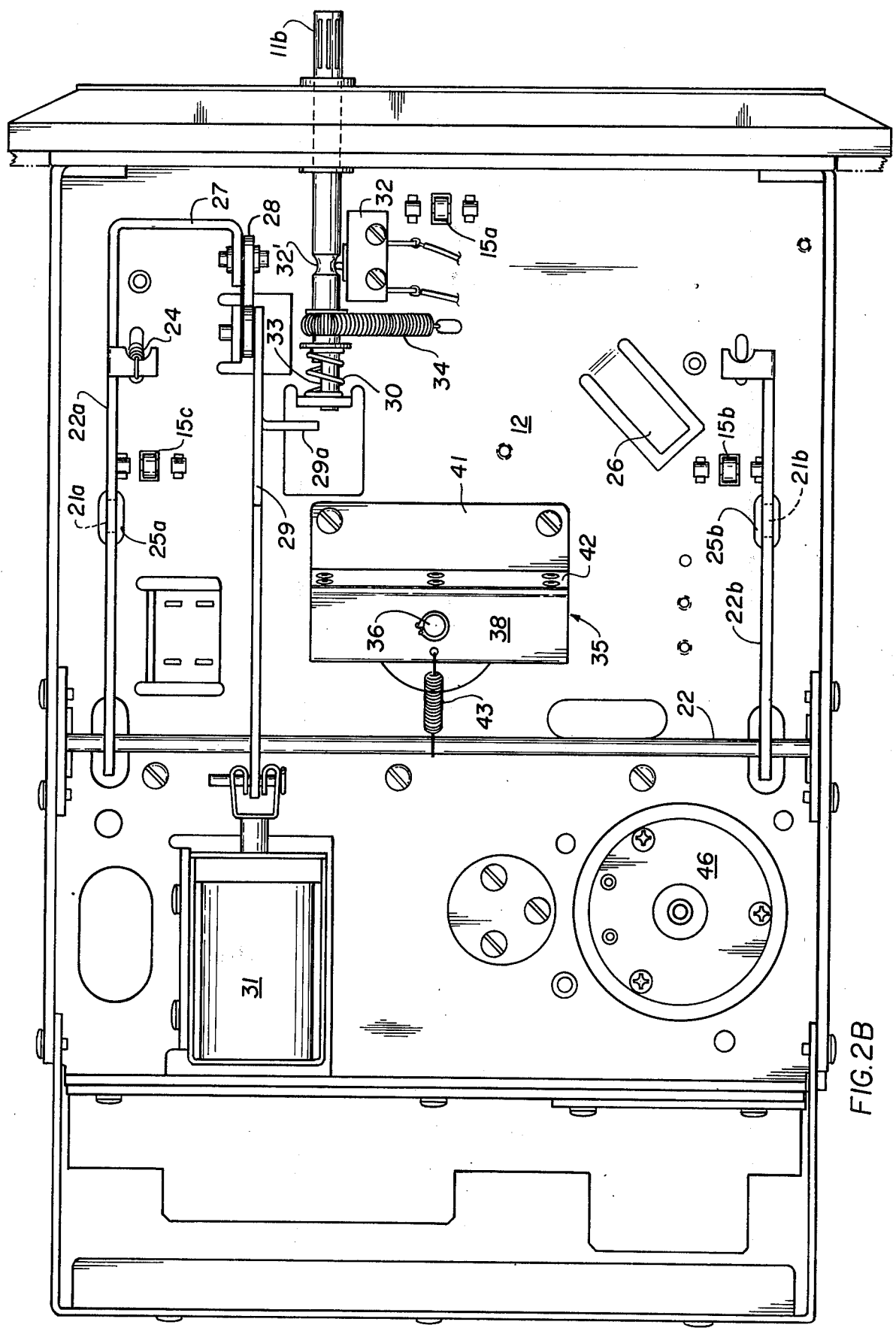
FIG. 2B is a bottom view of the tape deck showing the cartridge-latching mechanism and the support for the drive wheel.

The cartridge can be released from its slot 13 either manually by actuating the control rod 11b or automatically by means of an electrical signal which can be derived either from the tape (by means forming no part of the present invention) or from a remote point. The cartridge release mechanism includes, as best seen in FIG. 2B, an extension 27 of latch arm 22b engaged by one arm of a bell crank 28 pivotally supported by the base plate 12. The other arm of the bell crank 28 is coupled to a link 29 which, when moved to the left as seen in FIG. 2B, causes the bell crank to pivot to swing the two latch arms 22b and 22a to pull the latch fingers out of engagement with the notches C-4 in the cartridge C. Manual actuation of the release system can be achieved by rotating and pushing control rod 11b inwardly against a spring 30 to cause its end to engage an extension 29a on the link 29, thereby to release the latch. This procedure is used, for example, in the event of power failure. The control rod 11b can also be utilized to effect a powered or automatic release of the latch mechanism by means of a solenoid 31 coupled to the end of the link 29 and which is adapted to be energized through a switch 32 having its actuator normally received in a groove 32' in the control rod 11b, so that when the control rod 11b is pushed inward the switch is closed to energize the solenoid to pull the link 29 to rock the bell crank 28 and thereby lower the latch fingers 21a and 21b. In order that the direct mechanical coupling between the inner end of the control rod 11b and the lateral extension 29a will not engage under automatic operation, the inner end of control rod 11b includes a flat 33 which normally frees the link 29 and which when so oriented misses the link extension 29a so no mechanical action results. The rod 11b is, however, rotatable in its bearings against a biasing spring 34 which wraps partially around the rod 11b, as best seen in FIG. 2B. When the control rod 11b is both rotated and pushed, the mechanical coupling with the extension 29a occurs and release is effected manually.

If the purely mechanical release is desired, the switch 32 and solenoid 31 can be eliminated substituting, however, a small bracket or guide (not shown) to hold the linnk 29 in position where the solenoid had been. The torsion spring 34 is then wrapped around the unload control rod 11b in the opposite direction to cause the tip to engage the link extension 29a without requiring further manual rotation of the unload control rod 11b.

When the cartridge is released by the withdrawal of the latch fingers 21a and 21b from the notches C-4 in the cartridge base, the partially coiled flat spring 20 forces the cartridge outward, the cartridge moving with relative freedom on the lower set of three positioning rollers 15a, 15b and 15c and the upper pair of pressure rollers 17a and 17b. When the trailing, inner corners of the cartridge C drop off of the lower rollers 15b and 15c, the cartridge base will by its edges ride on the guide surface 14b which will increase the frictional drag at the precise moment the release spring 20 has become rewound to its dormant state under which it exerts no release pressure on the cartridge. The frictional forces of the guide, therefore, will hold the cartridge with a gentle force sufficient to prevent the cartridge from sliding out of the slot by its own momentum, and awaiting removal by the operator.

Another function performed by the tape deck is that of driving the tape within its cartridge. This is accomplished in the standardized cartridge design of FIG. 6A by establishing a driving coupling from tape deck to the belt capstan C-5 which presents a friction roller to the tape deck. Within the cartridge, the belt capstan C-5 drives a control belt which turns tape supply and takeup reels, causing the record tape to move past the read/write head 16 of the tape deck. Mounted in the tape deck on a yieldable, resiliently biased support, indicated generally by the numeral 35, is an arbor 36 carrying a drive roller 37 (FIGS. 2A, 3, 4 and 6A) which is preferably rubber covered for frictional engagement with the roller of the capstan of the tape cartridge. The arbor 36 is mounted in a U-shaped bracket 38 and carries at its upper end, above the drive roller 37, a sprocket wheel 39 spaced from the drive roller by means of bushing 40. The bracket 38 is joined to a mounting piece 41 on the base plate 12 of the tape deck by means of a flexure plate 42 which has its flexure axis preferably running transversely in a direction perpendicular to the directions of insertion and release of the cartridge C and parallel to the plane of the reference base of the cartridge and also the plane of the drive roller 37 in its upright operating condition with the tape cartridge fully inserted. A tension spring 43 swings the arbor mounting assembly forward, causing the arbor to tilt approximately 15° forward toward the slot opening into which the cartridge is inserted. When the cartridge is pressed home, its capstan C-5 (as best seen in FIG. 3) engages the drive roller 37 forcing the arbor into a vertical position against the force of tension spring 43. The flexure hinge, being free of any bearing play and being rigidly coupled between the mounting part 41 and the bracket 38, prevents wobble and maintains the precisely correct position for the drive roller with respect to the precision location of the cartridge C.

The sprocket wheel 39 is coupled by an endless belt 45 to the sprocket 46a of a remotely located drive motor 46 which, by virtue of its remote location and rigid mounting, can be larger and more powerful than those customarily used in tape deck assemblies in which the motor is located on the arbor axis of the drive roller. The endless belt 45 is passed around a pair of idler sprockets 47 and 48 carried on an adjustable mounting plate 49 clamped in position by a pair of screws 50. The clamping screws 50 are received in slots 51 which enable the plate 49 to be moved in a direction toward and away from the arbor 36 carrying the driven sprocket 39. The location of the idler sprockets 47 and 48 is such that, when the arbor 36 is in its vertical or cartridge-home position, the two limbs 45a and 45b of the belt 45 are disposed substantially parallel to the front face of the tape cartridge C and are also substantially parallel to the flexure hinge axis of the flexure plate 42. In this fashion, tension can be adjusted in the belt without imposing forces on the movable support for the arbor 36 in the direction of insertion or release of the cartridge. In addition, the configuration is such that a common plane exists between the driven sprocket 39, the idler sprockets 47 and 48, and the motor sprocket 46a. With such configuration, the dynamic forces attendant the operation of the belt system are such that the frictional drive coupling between the drive capstan C-5 and the drive roller 37 of the tape deck is uniformly strong. In addition, the plane of the endless belt in its operative position is precisely parallel to the reference plane of the bottom plate C-1 of the tape cartridge and hence precisely parallel to the plane established by the precision support rollers 15a, 15b and 15c. If desired, the single, endless belt joining the remote drive motor 46 to the drive sprocket 39 can take the form of two endless belts, in which case the two idler sprockets 47 and 48 would be replaced by a single axis assembly in which a pair of drive sprockets would be located one over the other on a common axis. In such case, the two belts would be contained in spaced-apart planes. Likewise, the relationship between the axis of the flexure plate 42 and the reference plane defined by the rollers 15a, 15b and 15c can be changed from parallel to perpendicular, thereby causing the carrier for the arbor 36 to swing on a vertical axis as it yields under the force of the inserted cartridge.

Various speed control mechanisms can be incorporated in the tape deck as are conventional in the prior art. Thus, for example, the capstan velocity can be servo-controlled to a precise ramp during start/stop modes and can be held at a constant value during reading or writing. Also, it should be understood that the data from the read/write head can be switched in accordance with conventional practice to various amplifiers and output connections.

We claim:

1. A tape deck mechanism for accommodating and actuating record tapes in cartridges having at least one external positioning reference plane, an input capstan and means to expose sequential sections of the tape to a transducer, comprising a cartridge housing, positioning reference means to engage the reference plane of the inserted cartridge, means to releasably secure the cartridge on the reference means, a drive roller to engage the capstan in the cartridge, a yieldable support for the drive roller to maintain driving relationship with the capstan of an inserted cartridge, a drive motor remote from the drive roller, and an endless belt coupling the motor to the roller, the limbs of the belt which drive the roller being oriented at substantially right angles to the direction of movement of the support for the roller when the roller and capstan are in driving engagement.

2. A tape deck as set forth in claim 1, said support for the drive roller being movable in a direction aligned with the direction of insertion of the cartridge, said drive motor being remote from the drive roller in directions both perpendicular to direction of motion of the support and in the direction of movement of the support, and guide means for the endless belt forming angles in the belt limbs between the drive motor and drive roller to establish the pair of limbs which engage the roller in the said substantially right angular orientation with respect to the direction of movement of the support.

3. A tape deck as set forth in claim 2, the axes of the limbs of the endless belt between the drive roller and the drive motor being contained in a common plane when the roller and capstan are in driving engagement.

4. A tape deck mechanism as set forth in claim 2, said guide means for the belt comprising a pair of spaced-apart guides defining parallel belt limbs between the guide means and the drive motor and between the guide means and the drive roller, and a common support for the guide means adjustably movable toward and away from the drive roller.

5. A tape deck mechanism as set forth in claim 1, said yieldable support for the drive roller being pivotally mounted and having a pivot axis spaced from the plane of the drive roller to afford translational movement of the drive roller to and away from the point at which the limbs of the endless belt are substantially perpendicular to the direction of movement.

6. A tape deck mechanism as set forth in claim 5, the pivot for the drive roller support comprising a flexure plate rigidly attached to both the support and the frame of the tape deck, and resilient means urging the support and drive roller in opposition to the direction of insertion of the cartridge.

7. A tape deck as set forth in claim 6, said flexure plate being disposed with its flexure axis disposed parallel to the plane of the drive roller.

8. A tape deck mechanism for accommodating and actuating record tapes in cartridges having at least one external positioning reference plane, an input capstan and means to expose a section of the tape to a transducer, the invention comprising cartridge insertion guides affording motion of the inserted cartridge in directions both perpendicular and parallel to the reference plane, three triangularly arrayed positioning reference points to engage the reference plane of the inserted cartridge, and resilient means to urge the reference plane of the cartridge against the reference points.

9. A tape deck mechanism as set forth in claim 8, each of said positioning reference points comprising a rotary member, said means to secure the cartridge on the reference points including a rotary bearing means disposed on the opposite side of the cartridge from the three reference numbers, a movable support for the rotary bearing means, and resilient means urging the rotary bearing means against the cartridge.

10. A tape deck mechanism as set forth in claim 1, comprising a coiled spring plate mounted on the frame of the tape deck and interposed in the path of insertion of the cartridge to engage the forward edge thereof and adapted to partially uncoil as the cartridge is inserted, thereby to impose resilient ejection forces continuously and uniformly on the cartridge, and releasable latch means to hold the cartridge in its inserted position against the force of the partially uncoiled spring.

11. A tape deck as set forth in claim 10, including means to adjustably position the coiled spring plate on the frame.

12. A tape deck mechanism as set forth in claim 10, said latch means including at least one movable finger to engage the cartridge in its path of ejection, an actuating member coupled to said latch means, first release means including an electromagnet to displace the actuating member, and second manually controlled means to displace the actuating member.

13. A tape deck mechanism as set forth in claim 12, said actuating member comprising a slide bar, said latch means comprising a pivot arm carrying the restraining finger, lever means coupling the bar to the pivot arm, an electromagnet coupled to the slide bar, and a manually actuatable push rod adapted to engage the slide bar.

14. A tape deck mechanism as set forth in claim 13, said push rod including a support affording both axial and rotary movement and being normally free of the slide bar during axial movement, and an actuating surface on the push rod adapted to engage the slide bar after rotation about its axis.

15. A tape deck mechanism as set forth in claim 14, including electrical switch means actuated by the push rod and connected to energize the electromagnetic means after axial movement of the push rod.

* * * * *